United States Patent [19]
Peterson

[11] 3,778,921
[45] Dec. 18, 1973

[54] LIVE-BAIT FISH-HOOK
[76] Inventor: Lonn M. Peterson, 616 W. Ella, Willmar, Minn. 56201
[22] Filed: July 29, 1971
[21] Appl. No.: 167,236

[52] U.S. Cl. .............................. 43/44.8, 43/44.83
[51] Int. Cl. ........................................ A01k 83/06
[58] Field of Search ............... 43/44.8, 44.2, 44.83

[56] References Cited
UNITED STATES PATENTS
| | | | |
|---|---|---|---|
| 2,093,954 | 9/1937 | Chilcott | 43/44.2 |
| 551,582 | 12/1895 | Crane | 43/44.8 |
| 2,138,702 | 11/1938 | Litsey | 43/44.83 X |

Primary Examiner—Russell R. Kinsey
Assistant Examiner—Daniel J. Leach
Attorney—James E. Olds

[57] ABSTRACT

A fish-hook formed from a single piece of wire and including a bight portion, a looped eyelet formed adjacent the bight portion, a shank portion extending from the looped eyelet, and terminating in a shank eyelet. The shank eyelet is formed by bending the wire into a partial loop proximately abutting itself and continuing on away from the shank portion to provide a guiding surface permitting a retaining line to resiliently deflect the wire and essentially open the shank eyelet while being passed into the shank eyelet.

3 Claims, 5 Drawing Figures

PATENTED DEC 18 1973 3,778,921

INVENTOR.
LONN M. PETERSON
BY James E. Olds
ATTORNEY

LIVE-BAIT FISH-HOOK

BACKGROUND OF THE INVENTION

Fishing is a sport and pastime enjoyed by young and old alike; this invention relates to a live-bait fish-hook that will add to the enjoyment of fishing.

In order to bait a hook with a live minnow, the common practice is to impale the pointed-barbed portion of the hook through the body just beneath the dorsal fin or through the lips of the minnow. Such impaling, even if properly done, seriously injures the minnow; however, if the hook is pushed through the minnow too far below the dorsal fin the hook may sever the minnow's spinal column resulting in immediate paralysis and death of the minnow. Also, by pushing the hook through the minnow too far behind the minnow's lips and through the head thereof may result in immediate death of the minnow. Another way of hooking a minnow is to pass the hook through both eyes, eye sockets, and the corresponding head portion of the minnow. Some people, particularly women, strongly object to such impaling treating of the minnow but up to now this impaling of the minnow was generally necessary if one wanted to fish with live minnows.

The impaling of the minnow and the corresponding serious injury thereto also has a detrimental effect of decreasing the activity of the minnow and an inactive or dead minnow is thought to be less effective in attracting game fish. Thus, the minnow must be occasionally checked and replaced by a fresh live minnow. Even the checking of the minnow, the reeling-in and the casting-out, additionally harms the minnow and shortens its remaining life. Some fishermen prefer to only occasionally check the minnow because the checking in itself is so harmful to the minnow.

The impaling of the minnow also presents a danger of the hook being painfully impaled into the fingers of the fisherman since it is common for the slippery minnow to slide within the fingers of a fisherman just as the hook is being pierced through the minnow.

The prior art contains various attempts to eliminate the impaling of the minnow such as the use of a harness surrounding the minnow, but such harnesses are thought to be relatively awkward to use, significantly inhibit the movement of the minnow, and are readily detected by game fish.

THE PRESENT INVENTION

The minnow retaining apparatus as disclosed by the present invention eliminates the necessity of impaling the minnow with a barbed-pointed end of the fish hook. Since the minnow need not be impaled and thus injured, some persons, especially women and children, will find fishing more enjoyable. The uninjured minnow is livelier, more active, should be more effective in attracting game fish, and has a longer life which eliminates much of the bait checking as is common with the conventional methods. Since the minnow has a longer life, the same need not be readily replaced resulting in a conservation of bait. It is thought that the present apparatus should be more effective in attracting larger game fish since such fish are attracted to more natural appearing minnows and are generally not known as scavengers consuming dead fish. Since game fish generally consume a minnow head first, it is believed that the present apparatus of the barb-pointed end located closely in front of the mouth of the minnow, as opposed to impaling the minnow under the dorsal fin or through the head as is conventionally done, may be more effective in hooking the game fish as the entire bight portion of the hook is left unimpaired for the purpose intended. Also, since it is believed that a game fish will first strike the body of a trolling minnow, the present apparatus of the unimpaired bight portion located near the middle of the body of the trolling minnow should be most effective in hooking the striking game fish.

Since the hook of the present apparatus is not impaled through the minnow, hooks made of larger diameter wire material may be used on small minnows, for fishing for such hard mouth fish as a red snapper, without any comparable injury to the minnow.

The minnow may be easily removed since it is not necessary to try to "work" the barb back through the minnow and another minnow may be more rapidly "baited" by the fisherman than by the prior art apparatuses and methods.

The impaling of a hook through the minnow often results in the hook being forced through the flesh of the hands of the fisherman since his hands are wet and slick from handling the slippery minnow; this danger to the fisherman is presently eliminated.

The shank portion of the hook is generally passed through the gill and mouth openings of the minnow, however, the shank portion may remain exterior of the minnow and the retaining line, one or two, may be passed through the gill and mouth openings of the minnow. It may be desired to use a braided wire type of leader retaining line especially when the same is passed through the minnow, to prevent the minnow or the striking game fish from cutting through the leader-line.

The apparatus of the present invention includes a minnow retaining hook comprising a bight portion, a looped eyelet formed adjacent to the bight portion, a shank eyelet extending from the looped eyelet for a length slightly more than the distance from the mouth to the gill opening of the particular minnow being presently used, and a shank eyelet that may be readily and resiliently opened for the easy insertion of the retaining line.

BRIEF DESCRIPTION OF THE DRAWING

The concepts and structure of this invention and the preferred embodiment will become better understood by reference to the following description when considered in connection with the accompanying drawing in which like numerals designate like parts throughout the figures and wherein.

DETAILED DESCRIPTION OF THE PREFERRED EMBODIMENT

Figure 1:
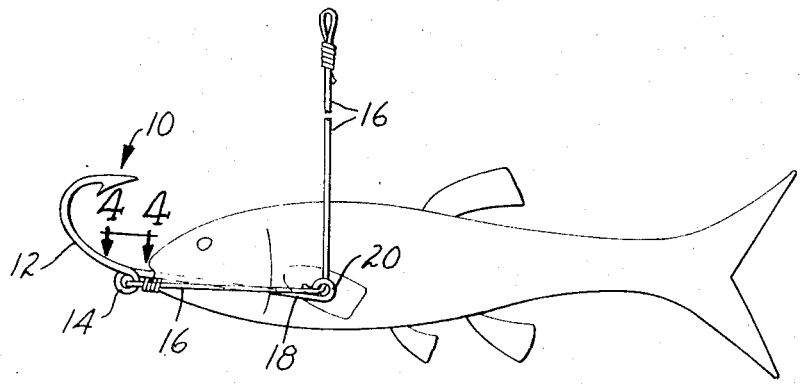
FIG. 1 is a side elevation view illustrating a fish-hook of the preferred embodiment retaining a minnow thereto in a still-fishing position.

The structure of the preferred embodiment is illustrated throughout the drawing and beginning the detailed description with FIG. 1, the fish-hook 10 is formed from a single piece of resilient steel wire having high strength properties and the property to maintain sharpness of the pointed end. The diameter of the wire will selectively vary with size of the hook and the size of the minnow desired to be used. The wire may also include a protective coating (not shown) to prevent the hook 10 from rusting, corroding or otherwise weathering from the elements. The hook 10 comprises a bight portion 12 terminating at the barb-pointed end and the opposite end integrally connected to a looped eyelet 14.

Figure 2:
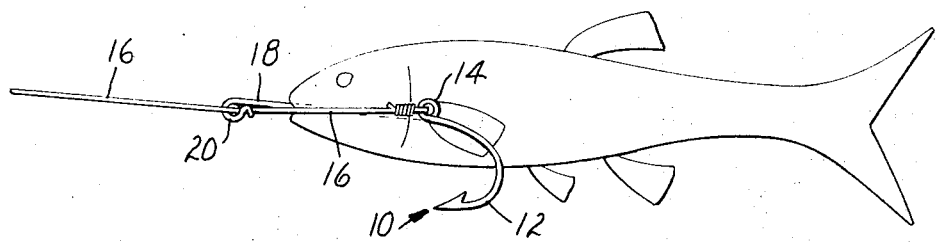
FIG. 2 is a side elevation view of the preferred embodiment retaining a minnow in a moving or trolling position.
Figure 4:
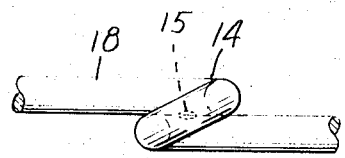
FIG. 4 is a view of the looped eyelet taken along lines 4—4 of FIG. 1 looking in the direction of the arrows.
Figure 5:
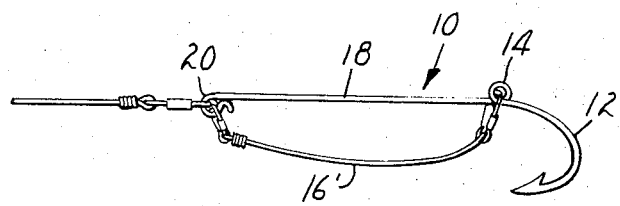
FIG. 5 is a side elevation view of a fish-hook harness.

The looped eyelet 14, generally located opposite from inside throat area of the bight portion 12 (as shown in FIGS. 1, 2 and 5) to minimize interference between the eyelet 14 and the game fish engaged by the bight portion, is formed by the wire being wound in a loop having a line receiving center opening of sufficient area to enable a retaining line 16 to be passed therethrough for subsequent tieing or securement of the line 16 to the eyelet 14. The wire at least proximately engages itself at the point of cross-over to provide essentially a closed loop to prevent the line 16 from slipping out of the eyelet 14 and along the wire; thus any gap between wire surfaces at the point of cross-over should be minimal to maintain the closed loop. As shown in FIG. 4, a spot weld 15 may be utilized between the wire surfaces to insure the maintenance of a closed loop.

The relatively straight length of wire extending from the eyelet 14 forms the shank portion 18 of the hook 10. The shank portion 18 may be formed into an arc (not shown) to provide greater ease in inserting and removing the shank eyelet 20 from the minnow. Integrally connected to the shank 18 at the end opposite from the eyelet 14 is the shank eyelet 20.

Figure 3:
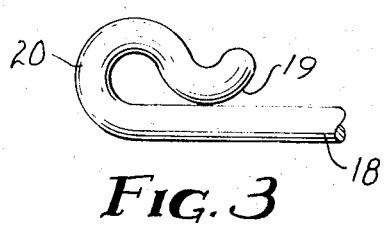
FIG. 3 is an enlarged side elevation view of the shank eyelet.

The shank eyelet 20 is formed by the wire being wound into at least a partial loop to abut itself and close the eyelet 20. The wire, after at least proximately abutting itself, continues on away from the shank portion 18 for a short distance (see FIG. 3) to provide a guiding surface 19 permitting the retaining line 16 to resiliently deflect the wire and essentially open the shank eyelet 20 while the line 16 is being readily passed into the center line receiving opening of the eyelet 20. Thus, a fisherman, having the retaining line secured to looped eyelet 14, can readily pass the shank eyelet through the mouth and gill openings, in the direction as shown in FIG. 1 or the direction as shown in FIG. 2, and then quickly and easily pass the line 16 along the guiding surface 19 into the eyelet 20. The wire of the eyelet 20 will then resilientlY snap back into the closed position (as shown in FIG. 3) with the line 16 retained within the eyelet 20. To readily remove the hook 10 from the minnow, the line is pulled out of the eyelet 20 along the surface 19, the shank 18 and eyelet 20 are passed back out through the gill and mouth openings. Since the eyelet 20 has minimal dimensions with no extending portions to gouge the inside of the minnow, the minnow should be relatively unharmed by the removal of the eyelet 20 from the minnow.

The eyelet 20 could be formed by the wire being looped about and at least proximately abutting the side of the shank portion 18 (as compared to abutting the bottom of the shank as shown in FIG. 3) and continuing on for a short distance away from the shank portion 18 to provide a guiding surface to allow deflective opening of the eyelet 20.

Since the minnow is not placed within the throat opening of the hook (as is normally done), the hook of the present invention will be more efficient in engaging and maintaining a game fish because of the lack of interference between the minnow and the bight portion 12. A hook of a size smaller than normally selected for the particular fish sought could provide added effectiveness in fishing.

The fishing harness as shown in FIG. 5 includes the fish-hook 10 and the addition of retaining line 16' (one or more) tied or otherwise secured to the eyelet 14 and including a snap connector, at the end opposite from the eyelet 14, to releasably secure the line 16' to the shank eyelet 20. The shown snap connector could be replaced by metal rings, secured to the line 16', and insertable into the eyelet 20 similarly as the retaining line 16 is passed into the eyelet 20 as above described.

The method of securing a minnow to a fish-hook without impaling the minnow, as above described, is also a part of this invention.

Various modifications and alterations of this invention will become apparent to those skilled in the art without departing from the scope and spirit of this invention, and it should be understood that this invention is not to be unduly limited to the illustrative embodiments set forth hereinabove.

What I claim is:

1. A fish-hook formed from a single piece of wire and having particular utility in passing through the mouth and gill openings of a minnow for retaining a minnow thereto, siad hook comprising:
    a. a bight portion formed from said wire and having a terminated pointed end for engaging game fish;
    b. a looped eyelet formed adjacent said bight portion by said wire being wound into a loop proximately engaging itself at the point of cross-over, said looped eyelet defining a line receiving opening of sufficient area to enable a retaining line to be passed therethrough for securement to said looped eyelet;
    c. a shank portion extending from said looped eyelet for a length slightly more than the distance from the mouth to the gill opening of a said minnow; and
    d. a shank eyelet formed at the end of said shank portion opposite from said looped eyelet by said wire being formed into at least a partial loop proximately abutting itself, said shank eyelet formed to extend away from said shank portion after proximately abutting said shank portion to provide a guiding surface permitting a said retaining line to resiliently deflect said wire and essentially open said shank eyelet while a said retaining line is being passed into the shank eyelet opening, said shank eyelet having minimal exterior dimensions to enable said shank eyelet to be easily passed through the mouth and gill openings of a said minnow, said shank eyelet defining a line receiving opening of sufficient area to enable a said retaining line to be passed therethrough for retaining a said minnow between said shank portion and the retaining line extending between said looped and shank eyelets exterior of a said minnow.

2. A fish-hook and harness combination having particular utility for retaining a minnow thereto, comprising:
    a. a fish-hook formed from a single piece of wire including 1. a bight portion formed from said wire and having a terminated pointed end for engaging game fish;
2. a looped eyelet formed adjacent said bight portion by said wire being wound into a loop proximately engaging itself at the point of cross-over, said looped eyelet defining a line receiving opening of sufficient area to enable a retaining line to be passed therethrough for securement to said looped eyelet;
3. a shank portion extending from said looped eyelet for a length slightly more than the distance from the mouth to the gill opening of a said minnow; and
4. a shank eyelet formed at the end of said shank portion opposite from said looped eyelet by said wire being formed into at least a partial loop proximately abutting itself, said shank eyelet having minimal exterior dimensions to enable said shank eyelet to be easily passed through the mouth and gill openings of a said minnow, said shank eyelet defining a line receiving opening of sufficient area to enable a said retaining line to be passed therethrough for retaining a said minnow between said shank portion and the retaining line extending between said looped and shank eyelets exterior of the minnow; and b. a retaining line secured at one end to said looped eyelet, said retaining line including a connector at the end opposite from the end secured to said looped eyelet to releasably secure said retaining line to said shank eyelet.

3. A method of securing a minnow to a fish-hook without impaling the minnow, said method comprising:

a. providing a fish-hook formed from a single piece of wire having a bight portion, a looped eyelet formed adjacent said bight portion, a shank portion extending from said looped eyelet, a shank eyelet formed at the end of said shank portion opposite from said looped eyelet;

b. inserting said shank eyelet through the mouth and gill openings of a said minnow to position said looped and shank eyelets exterior of said minnow; and c. attaching a retainer line between said looped and shanked eyelets exterior of the minnow to retain a said minnow between said shank portion and retaining line.

* * * * *